United States Patent [19]

Maricle et al.

[11] 4,125,676
[45] Nov. 14, 1978

[54] CARBON FOAM FUEL CELL COMPONENTS

[75] Inventors: Donald L. Maricle, Glastonbury, Conn.; Dennis C. Nagle, Catonsville, Md.

[73] Assignee: United Technologies Corp., Hartford, Conn.

[21] Appl. No.: 824,759

[22] Filed: Aug. 15, 1977

[51] Int. Cl.$^2$ ............................................... H01M 4/96
[52] U.S. Cl. ......................................... 429/38; 429/40
[58] Field of Search .................... 429/27, 41, 209, 38, 429/40; 423/447.1, 445

[56] References Cited

U.S. PATENT DOCUMENTS

| | | | |
|---|---|---|---|
| 2,924,634 | 2/1960 | Fischbach et al. | 429/27 |
| 2,997,518 | 8/1961 | Klopp et al. | 429/27 |
| 3,810,789 | 5/1974 | Vermeulen et al. | 429/209 |
| 3,871,922 | 3/1975 | Bohm et al. | 429/40 |
| 3,922,334 | 11/1975 | Marek et al. | 423/445 |
| 4,024,226 | 5/1977 | Lersmacher et al. | 423/445 |
| 4,038,463 | 7/1977 | Lamarine et al. | 429/41 |

Primary Examiner—Donald L. Walton
Attorney, Agent, or Firm—Stephen E. Revis

[57] ABSTRACT

In an electrochemical cell, such as a fuel cell, the gas distribution layer, which is the layer of material disposed directly behind and contiguous with the catalyst layer, is made from gas porous open cell carbon foam. Vitreous carbon foam is preferred. Vitreous carbon foam is extremely corrision resistant to many of the very reactive chemicals which might be used as an electrolyte in a fuel cell, such as phosphoric acid. It also has low electrical resistivity, good thermal conductivity, and can be made very thin and inexpensively. Preferably the cell catalyst layer is applied directly to one surface of the foam layer.

10 Claims, 2 Drawing Figures

CARBON FOAM FUEL CELL COMPONENTS

BACKGROUND OF THE INVENTION

1. Field of the Invention

This invention relates to fuel cells and more particularly to a stack of fuel cells.

2. Description of the Prior Art

A basic fuel cell comprises an anode electrode spaced apart from a cathode electrode with an electrolyte disposed therebetween in a compartment formed between the two electrodes. Typically each electrode comprises a thin catalyst layer adjacent to the electrolyte and disposed upon a layer of support material usually called the electrode substrate. Behind the substrate is a reactant gas compartment. The substrate is gas porous perpendicular to its thickness so that reactant gas which is fed into the compartment behind the electrode substrate diffuses therethrough to the catalyst layer. An electrochemical reaction occurs at the gas/electrolyte/catalyst interface whereby ions travel from one electrode to the other through the electrolyte.

Commercially useful amounts of electric power require stacking a plurality of cells and connecting them electrically in series. Electrically conductive gas impermeable plates separate the anode of one cell from the cathode of the next adjacent cell. These separator plates include the ribs (or other protrusions) on each side thereof which contact the electrode substrates. The ribs provide paths for the current to flow from one cell to the next while defining reactant gas compartments (such as channels) behind each substrate. In this manner gas is distributed over the back surface of each electrode. The ribs or protrusions also provide structural rigidity to the stack of cells and support to the electrodes which are usually made as thin as possible. A fuel cell stack constructed in accordance with the foregoing description is shown in commonly owned U.S. Pat. No. 3,994,748 to H. R. Kunz and C. A. Reiser.

Ribbed gas separator plates are expensive to make; and the ribs (or any other type of protrusions) create other problems, such as maldistribution of the reactant gas to the catalyst layer. For example, direct perpendicular passage (through plane) of the reactant gas to the catalyst layer through the areas of contact between the separator ribs and electrode substrate is blocked. Reactant gas must diffuse in plane through the substrate under the ribs to reach catalyst disposed on the substrate directly beneath the ribs. This diffusion is made more difficult because the substrate layer is somewhat compressed directly under the ribs and may be only several mils thick prior to compression.

The voltage across a stack of fuel cells is the sum of the voltage gains across the individual cells, which is a function of the current produced by each cell. The current passes perpendiclar to the plane of the electrodes from one end of the stack to the other. The current density through a stack of cells is equal to the current divided by the cross-sectional area through which the current passes at any particular cross-sectional plane. It is a constant at any one particular plane for any one particular power setting. If the cross-sectional area through a plane is reduced and total electric power generated is held constant, the current density must increase in that plane. Voltage losses are directly proportional to the current density; thus, at constant power, voltage is lost whenever the cross-sectional area through which the current passes is reduced. Such an area reduction occurs at the interface between the electrodes and the ribs or other protrusions of the separator plates since the contact area between the plates and the electrodes may only be on the order of 50% of the electrode cross-sectional area. Because perfect contact even between flat mating surfaces is impossible to achieve, there are also contact losses at every interface between adjacent components, particularly if they are not bonded together.

Satisfactory solutions for eliminating the above-discussed problems are continually being sought, but until the present invention have not been found.

SUMMARY OF THE INVENTION

One object of the present invention is an electrochemical cell stack which may be manufactured more economically.

Another object of the present invention is to reduce the maldistribution of reactant gas to the catalyst layers of an electrochemical cell.

A further object of the present invention is a highly porous electrolyte resistant material suitable for use both as a catalyst substrate and as a gas distribution layer in an electrochemical cell.

Accordingly, the present invention is an electrochemical cell gas distribution layer of gas porous open cell carbon foam. Preferably the layer is open cell vitreous carbon foam; and more preferably the vitreous carbon foam is a carbonized urethane foam.

"Gas distribution layer," as that phrase is used herein and in the appended claims, is the layer of material in an electrochemical cell which is disposed directly behind and contiguous with the catalyst layer. It often serves as a substrate for the catalyst layer. The reactant gas must pass through this layer to reach the catalyst. Also, "layer" is used in a broad sense and may be a thin or thick coating as well as a self-supporting sheet or plate. Although "layer" is a singular noun, in this application a "layer" may include more than one layer. "Foam" simply means a cellular structure, each cell (i.e., pore) being formed by a plurality of interconnected struts. In a vitreous carbon foam the struts are made of vitreous carbon. Vitreous carbon is a glassy carbon which we have found to be extremely corrosion resistant to concentrated phosphoric acid at temperatures up to at least 400° F, as well as being corrosion resistant to many other very reactive chemicals. It also has low electrical resistivity, good thermal conductivity, and can be made with a variety of pore sizes and in sheets as thin as only several mils thick. Foam made of any carbon (including graphite) which is compatible with the fuel cell environment is intended to be within the scope of the present invention.

In commonly owned U.S. Pat. application Ser. No. 824,766 by P. Damiano titled FUEL CELL STRUCTURE, filed on even date herewith and incorporated herein by reference, there is described an electrochemical cell which eliminates the need for reactant gas compartments behind the electrodes, thereby eliminating the need for ribbed separator plates and permitting the use of thin, flat separator plates or other types of gas impermeable layers between adjacent cells. In the Damiano application, a porous member fills the space between cells. Reactant is supplied to the catalyst layer by having each porous member include a gas distribution layer sufficiently thick and having enough pores sufficiently large to permit a substantially free flow of reactant gas through the gas distribution layer in a direction parallel to as well as perpendicular to the plane of its surfaces. According to one aspect of the present invention, open cell carbon foam is advantageously employed as this gas distribution layer.

In accordance with another aspect of the present invention, open cell carbon foam may be employed as the ribbed electrode substrate material described in commonly owned U.S. Pat. application Ser. No. 824,764 by D. Nagle and L. Christner titled RIBBED ELECTRODE SUBSTRATE, filed on even date herewith and incorporated herein by reference. Actually, according to the present invention, open cell carbon foam may be used in place of any prior art gas distribution layer material.

The foregoing and other objects, features, and advantages of the present invention will become more apparent in the light of the following detailed description of preferred embodiments thereof as illustrated in the accompanying drawing,

DESCRIPTION OF PREFERRED EMBODIMENTS

Figure 1:
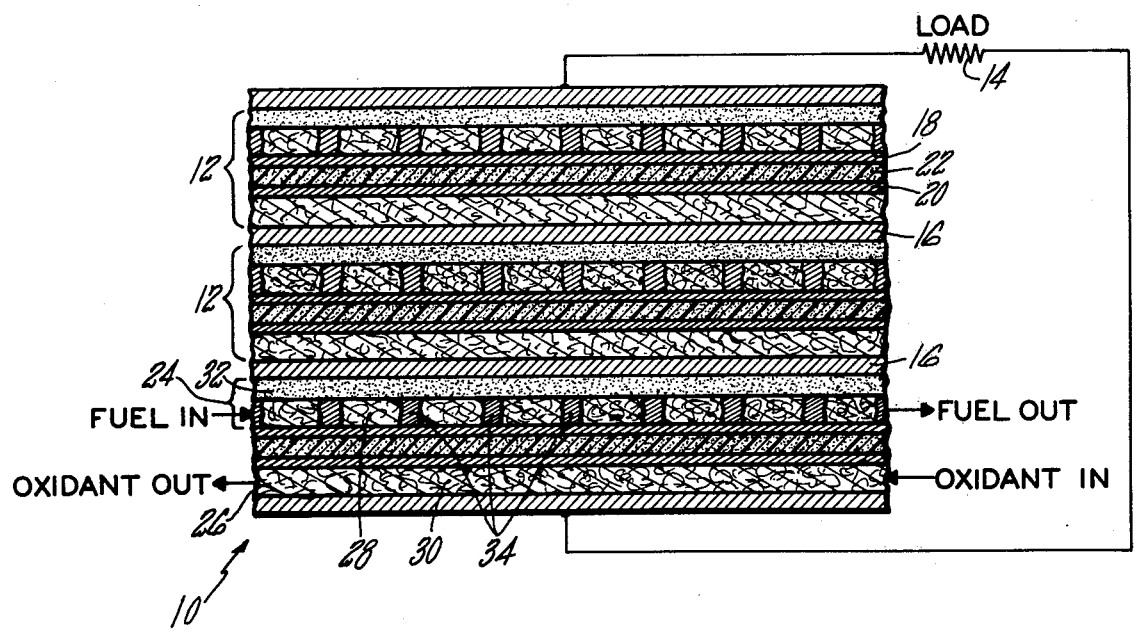
FIG. 1 is a cross-sectional view of a fuel cell stack according to one embodiment of the present invention and is not to scale.

FIG. 1 shows a fuel cell stack 10 in accordance with an exemplary embodiment of the present invention. The cell stack 10 includes a plurality of fuel cells 12 connected electrically in series through a load 14. Electrically conductive separators 16 are disposed between adjacent cells and prevent mixing of the reactants flowing through the cells on each side of the separators. In this embodiment the separators 16 are flat plates; they may be made, however, from the same materials and by the same processes as prior art ribbed separator plates. For example, they may be made in accordance with the teachings of U.S. Pat. Nos. 3,801,374 to G. H. Dews and R. W. Vine or 3,634,569 to R. C. Emanuelson and W. L. Luoma. They may also be made in accordance with the novel method described in commonly owned, copending U.S. Pat. application Ser. No. 824,760 to L. Christner, J. Harrington, and D. Nagle titled METHOD FOR MAKING A MOLDED ALL CARBON ARTICLE filed on even date herewith.

Each cell 12 includes an anode catalyst layer 18 spaced apart from a cathode catalyst layer 20 with an electrolyte retaining matrix layer 22 sandwiched therebetween and in substantially continuous contact with the surfaces of each of the catalyst layers. Each cell 12 also includes a porous member 24 disposed behind and filling the space between the anode catalyst layer 18 and the separator 16, and a porous member 26 disposed behind the cathode catalyst layer 20 and the separator 16. Each of the porous members 24, 26 fills the space between and is in substantially continuous contact with the surfaces of the catalyst layer and separator on each side thereof.

In accordance with the present invention, the porous members 24, 26 include gas distribution layers 28, 30, respectively, made from open cell carbon foam. In this embodiment the carbon is vitreous carbon. Each gas distribution layer is in substantially continuous contact with the entire surface of its associated catalyst layers 18, 20. The phrase "open cell," as used herein and in the appended claims, refers to the cell structure of the foam without regard to any later impregnation of the foam such as for improving the capability of the foam to wick electrolyte to a reservoir as hereinafter discussed.

In this embodiment each fuel cell 12 includes an electrolyte reservoir layer 32 on the anode side of the cell for storing excess electrolyte volume during cell operation. The reservoir layer 32 is a flat, continuous layer of hydrophilic material disposed between the separator 16 and the gas distribution layer 28 and in continuous contact with the surfaces thereof. Impregnations of hydrophilic material form uniformly distributed hydrophilic, small pore regions 34 through the open cell vitreous carbon gas distribution layer 28, and provide liquid communication or wicking paths from the catalyst layer 18 to the reservoir layer 32, in a manner analogous to that shown in FIG. 2 or 3 of commonly owned U.S. Pat. No. 3,905,832 to J. C. Trocciola, incorporated herein be reference.

Reservoirs for storing excess electrolyte are well known in the art. Commonly owned U.S. Pat. No. 3,634,139 shows a reservoir which is external to the fuel cell. A fuel cell which uses an external reservoir would not require a reservoir layer such as the layer 32 shown in FIG. 1. Other types of reservoir layers are shown in commonly owned U.S. Pat. No. 3,748,179 to C. L. Bushnell and in aforementioned U.S. Pat. No. 3,905,832. The fuel cells shown in those patents include reservoir material behind at least one of the electrodes of the fuel cell; however, note that provisions are always made to provide a reactant gas compartment behind each electrode. The arrangement shown in the embodiment of FIG. 1 is considerably simpler than the arrangements shown in the latter two patents.

The gas distribution layers 28, 30 are each highly gas porous both perpendicular to (through plane) and parallel to (in-plane) the planes of their surfaces. Reactant gas is distributed to the catalyst layers by introducing gas into the gas distribution layers 28, 30 via one of the edges of the gas distribution layers. The reactant gas travels across the cell (horizontally in the figure) and to the catalyst layer (vertically in the figure) through the pores of the gas distribution layers, and unconsumed reactant exhausts on the other side of the cell through one of the other edges of the gas distribution layer. Reactant manifolding may be as shown in hereinbefore mentioned U.S. Pat. No. 3,994,748. The critical characteristics of the gas distribution layer are that it be sufficiently thick and have enough pores sufficiently large to permit a substantially free flow of the reactant gas therethrough both parallel to and perpendicular to the planes of its surfaces. This is in addition to other well-known requirements of fuel cell components, such as electrical conductivity, thermal conductivity, compatibility with the electrolyte, and sufficient strength. The phrase "substantially free flow" as used herein and in the appended claims simply means that the pressure drop across the gas distribution layer (both in plane and through plane) is at an acceptably low level. What is acceptable will vary according to cell materials and design as well as other specifications which may be imposed as a result of the application for which the stack is intended. For example, the higher the pressure drop from an inlet edge of the gas distribution layer to an outlet edge the more energy required to pump the reactant gas through the cell. Any energy used to pump reactants is energy lost, and efficiency of the system is thereby reduced. Also, higher pressure drops from edge to edge tend to create higher pressure differentials across the matrix layer 22 and will result in either reactant gas crossover from one side of the matrix to the other or electrolyte being forced out of the matrix if the pressure difference is too high.

The required characteristics of the vitreous carbon gas distribution layer will be determined by numerous factors such as cross-sectional area of the cell, desired current density, reactant pressures and utilizations, and stack cooling requirements. For example, land based power generating stations will have individual cells having a cross-sectional area probably greater than about 2.0 square feet; economy, long life, and high power density will be critical requirements. We believe that the gas distribution layers of the cells used in these generating stations should be at least 80% porous (preferably at least 90% porous), no more than 120 mils thick (preferably less than 100 mils thick), and have between 20 and 60 pores per linear inch. We feel that gas distribution layers with greater than 60 pores per linear inch would result in excessive resistance to gas flow through the layer. If the layer had less than 20 pores per linear inch the material would probably be non-continuous. Thicknesses greater than 120 mils may increase the iR drop, thermal resistance, and stack height to unacceptable values.

In accordance with one aspect of the present invention the separator 16 could be bonded to the surfaces of the porous members 24, 26 on each side thereof, and the catalyst layers 18, 20 of adjacent cells could be bonded to the opposite surfaces of the porous members, thereby forming a unitized component. These components could be used in putting together a fuel cell stack by placing them one upon the other with an electrolyte matrix layer 22 disposed therebetween. Bonding of the catalyst layers to the porous members can be accomplished by a variety of known techniques, such as by applying the catalyst layer to the gas distribution layer using the screen printing, spraying, or filtration-transfer technique. Also, if desired, the matrix layer could be bonded to one or the other of the catalyst layers as part of the unitized component; or a half thickness matrix layer could be bonded to each of the catalyst layers. If the matrix were made from resin bonded silicon carbide, it could be applied by the screen printing process taught in commonly owned U.S. Pat. No. 4,001,042 by J. C. Trocciola, D. E. Elmore, and R. F. Stosak. This would result in unitized fuel cell stack components which could be stacked directly one atop the other to form the fuel cell stack. Bonding the varous layers together increases the surface contact area therebetween thereby reducing voltage losses and improving current distribution through the stack. The present invention does not require that the various layers be bonded together.

The open cell vitreous carbon foam gas distribution layers 28, 30 (before impregnation with hydrophilic material 34) may be made by several methods. One particularly suitable method is described in U.S. Pat. No. 3,927,186 incorporated herein by reference, wherein open cell vitreous carbon foam is made by carbonizing a urethane foam. The method described therein yields a vitreous carbon foam having substantially the same pore structure as the urethane foam before carbonization, thereby making it relatively easy to control the pore size of the finished article. Other methods for making open pore vitreous carbon foam are described in U.S. Pat. Nos. 3,345,440; 3,574,548; 3,666,526; and 3,922,334. Chemotronics International Incorporated, Michigan, assignee of U.S. Pat. Nos. 3,927,186, offers for sale an open cell vitreous carbon foam under the trademark RVC.

Figure 2:
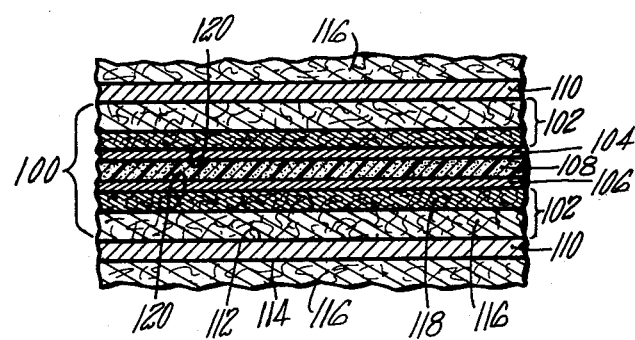
FIG. 2 is a cross-sectional view of part of a fuel cell stack according to another embodiment of the present invention and is not to scale.

FIG. 2 shows another embodiment of the present invention. In this embodiment there is no separate reservoir layer for storing excess electrolyte. This embodiment is particularly suited for cells having external electrolyte reservoirs. It may also be used if the gas distribution layer has a suitable range of randomly distributed pore sizes, wherein the smaller pores become filled with excess electrolyte while the larger pores always remain open, as is taught in commonly owned U.S. Pat. application Ser. No. 719,877 to Paul E. Grevstad filed on Sept. 1, 1976, now U.S. Pat. No. 4,035,551.

As shown in FIG. 2, an electrochemical cell 100 is one of several disposed one atop the other to form a stack of cells. Each cell 100 comprises a pair of gas distribution layers 102, an anode catalyst layer 104, and a cathode catalyst layer 106. The catalyst layers are spaced apart and include an electrolyte retaining matrix layer 108 sandwiched therebetween. The cell stack includes gas separators 110 disposed between adjacent cells 100. The gas distribution layers on each side of a separator 110 are in substantially continuous contact with the opposing surfaces 112, 114 of the separator.

In this embodiment each catalyst layer 104, 106 is bonded to the surface of its respective gas distribution layer 102 forming an anode electrode and a cathode electrode, respectively. If the pores of the gas distribution layer are too large, the catalyst layer may, when applied, penetrate the gas distribution layer to an unacceptable extent rather than stay, as desired, substantially on the surface. This problem is avoided by the embodiment of FIG. 2 wherein each gas distribution layer 102 includes a relatively thick large pore layer 116 adjacent the separator layer and a thinner smaller pore layer 118 adjacent the catalyst layer. Both layers are made from gas porous open cell vitreous carbon foam. The large pore layer 116 is sufficiently thick and includes enough pores sufficiently large to permit a substantially free flow of a reactant gas therethrough both perpendicular to and parallel to the planes of its surfaces. The layer 118, which is preferably less than 20 mils thick, provides a small pore surface 120 onto which the catalyst layers 104, 106 may be applied without the catalyst layer material penetrating the gas distribution layer 102 to an excessive depth. This is desirable in order to maximize the useful catalyst surface area. Typical polytetrafluoroethylene bonded platinum catalysts might require a surface having on the order of 250–2,500 pores per linear inch.

It is not essential that the layers 116, 118 be made of the same material (i.e., open cell vitreous carbon foam). The small pore layer may, for example, be made in the same manner as any prior art substrate material adapted to have a catalyst layer applied to the surface thereof, as exemplified by the method for forming a substrate taught in the commonly owned U.S. Pat. No. 3,972,735 to R. D. Breault. The small pore layer 118 may also be formed, for example, by a suitable impregnation, to a shallow depth, of the catalyst facing surface of the larger pore open cell vitreous carbon foam layer 116, thereby reducing the effective pore size at least near the surface thereof.

As with the embodiment of FIG. 1, the various layers of this embodiment may be bonded to each other over their abutting surfaces to form unitized components which may be placed one atop the other to form the fuel cell stack. Whether or not the gas distribution layer 102 actually requires a smaller pore catalyst substrate layer adjacent the catalyst layer will depend upon several factors including 1) whether or not and how the catalyst layer is to be applied (i.e., bonded) to the surface of the gas distribution layer; 2) the composition of the catalyst layer; and 3) the pore size of the larger pore layer 116.

An experimental 60 mil thick vitreous carbon foam gas distribution layer was made according to the following procedure: Five grams of an aqueous solution of 85% phosphoric acid was mixed with 5 grams of distilled water. The mixture was slowly added to 95 grams of furfuryl alcohol while mixing at room temperature. Mixing of the solution was continued for 30 minutes at room temperature. A 125 mil thick sheet of a polyester type polyurethane foam (called Scott Industrial Foam and produced by the Scott Paper Compay, Foam Products Division, Chester, PA) having a basis weight of 4 pounds per cubic foot and 30 pores per linear inch was immersed in the acid/alcohol solution for 30 minutes. The foam expanded as a result of absorbing some of the solution. After removing the foam from the solution the excess liquid therein was allowed to drain. Remaining excess liquid was blown out of the pores using an air nozzle. The wet foam was placed on a clean graphite plate and shimmed to the desired thickness of 60 mils. The foam was covered with another graphite plate to prevent warping. The wet foam was then carbonized in an atmosphere of nitrogen and in the presence of charcoal up to a temperature of 1100° C, the temperature being increased from room temperature to the desired maximum temperature of 1100° C at a rate of 154° C per hour. By this temperature virtually all of the resin has been converted to vitreous carbon. The foam was then heated from 1100° C up to 2100° C over a period of 3 hours and maintaining 2100° C for 2 hours to improve corrosion resistance. The finished gas distribution layer material had a porosity of 94%, 30 pores per linear inch, and a basis weight of 7 pounds per cubic foot.

Note that it is not necessary to start with an overly thick sheet of foam and to reduce it by compression to the desired thickness as was done in the foregoing example. It was necessitated in this case because we were unable to purchase a polyurethane foam which had the desired characteristics and was initially thin enough. Notwithstanding the above, compressing the foam did improve the compressive strength of the finished part, and from that point of view it is beneficial.

A two inch by two inch cell incorporating a cathode gas distribution layer made according to the foregoing example was tested under fuel cell operating conditions using phosphoric acid electrolyte, air as the oxidant, and a fuel composed of 79.6% $H_2$, 18.7% $CO_2$ and 1.7% CO. The reactants were supplied at just above atmospheric pressure and were exhausted at atmospheric pressure. The cathode side of the cell had no conventional gas channels. Air was fed to the cell directly into one edge of the porous cathode gas distribution layer. A flat separator abutted the back surface of the layer. A platinum catalyst was applied directly to front surface of the layer. The anode side of the cell used conventional components including a ribbed separator type plate to form fuel gas channels. A reservoir layer behind the anode substrate provided the only excess electrolyte storage in the cell. The cell performed as well as cells having conventional components on both the anode and cathode sides.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. In a fuel cell comprising an anode catalyst layer spaced apart from a cathode catalyst layer, the space therebetween adapted to have electrolyte disposed therein, and wherein said fuel cell operates on gaseous reactants, the improvement comprising:

a gas distribution layer having first and second opposing surfaces, said second surface being in substantially continuous contact with one of said catalyst layers, said gas distribution layer including a first layer of open cell vitreous carbon foam, said foam layer being gas porous, sufficiently thick and including enough pores sufficiently large to permit a substantially free flow of a reactant gas through said pores both perpendicular to and parallel to the planes of said surfaces, said first layer being at least 80% porous; and a gas impermeable separator layer in substantially continuous contact with said first surface of said gas distribution layer.

2. The improvement according to claim 1 wherein said gas distribution layer includes a second gas porous layer of fine pores defining said second surface and in continuous contact with said first layer, said fine pores sized to permit said catalyst layer to be applied thereto without a substantial amount of catalyst entering said fine pores.

3. The improvement according to claim 1 wherein said second layer is open cell vitreous carbon foam.

4. The improvement according to claim 1 wherein said vitreous carbon foam is a carbonized urethane foam.

5. The improvement according to claim 4 wherein said vitreous carbon foam has substantially the same pore structure as the urethane foam before carbonization.

6. The improvement according to claim 1 wherein said gas distribution layer is no more than 120 mils thick and said first layer has between 20 and 60 pores per linear inch.

7. The improvement according to claim 1 wherein said gas distribution layer includes hydrophilic material at select, uniformly distributed locations, each select location extending from said first to said second surface.

8. The improvement according to claim 1 wherein said first layer is at least 90% porous and said gas distribution layer is no more than 100 mils thick.

9. The improvement according to claim 1 wherein said space between said anode catalyst layer and cathode catalyst layer has phosphoric acid electrolyte disposed therein.

10. In a fuel cell comprising an anode catalyst layer spaced apart from a cathode catalyst layer, the space therebetween adapted to have electrolyte disposed therein, and wherein said fuel cell operates on gaseous reactants, the improvement comprising:

a gas distribution layer having first and second opposing surfaces, said second surface being in substantially continuous contact with one of said catalyst layers, said gas distribution layer including a first layer of open cell vitreous carbon foam, said foam layer being gas porous, sufficiently thick and including enough pores sufficiently large to permit a substantially free flow of reactant gas through said pores both perpendicular to and parallel to the planes of said surfaces, said first layer being at least 80% porous;

a hydrophilic reservoir layer, one side thereof being in substantially continuous contact with said first surface of said gas distribution layer;

a gas impermeable separator layer in substantially continuous contact with the other side of said reservoir layer; and hydrophilic wicking paths extending from said one catalyst layer through said gas distribution layer to said reservoir layer at select, uniformly distributed locations.

* * * * *